Nov. 13, 1923.

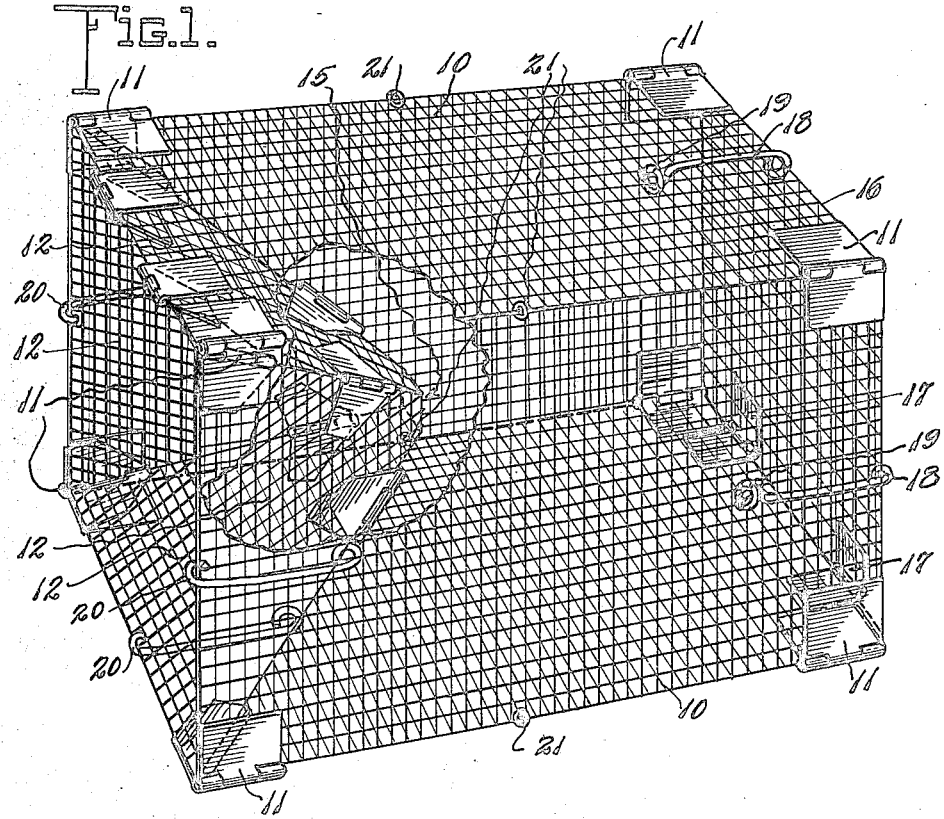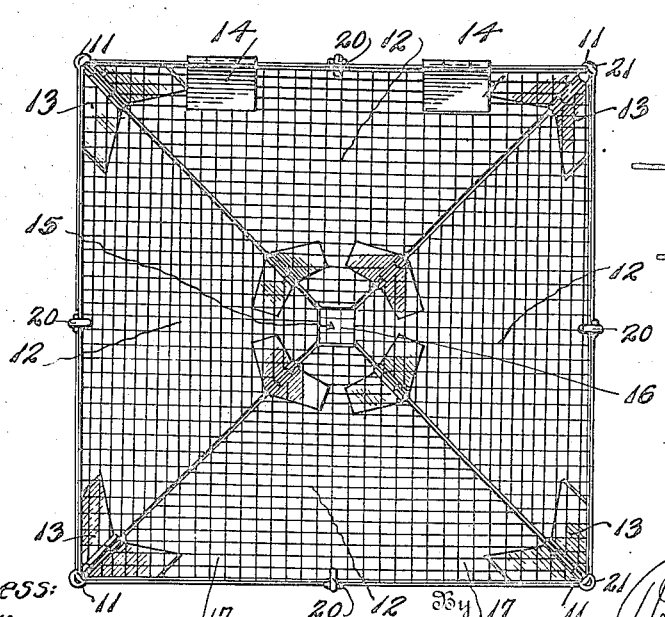

G. H. PRIME

MINNOW TRAP

Filed Feb. 28, 1923

Inventor
G.H. Prime

Witness:
C.H. Wagner

By Robb, Robb & Hill
Attorneys

Patented Nov. 13, 1923.

1,474,087

UNITED STATES PATENT OFFICE.

GEORGE H. PRIME, OF NORWICH, NEW YORK.

MINNOW TRAP.

Application filed February 28, 1923. Serial No. 621,893.

*To all whom it may concern:*

Be it known that I, GEORGE H. PRIME, a citizen of the United States, residing at Norwich, in the county of Chenango and State of New York, have invented certain new and useful Improvements in Minnow Traps, of which the following is a specification.

This invention relates to a minnow or fish trap and particularly to a construction adapted to be collapsed and folded into convenient form for transportation in the kit of a fisherman or other party using the same.

In the prior art the folding type of traps have generally failed to provide a structure which would fold into substantially flat form for transportation and when opened for use were not rigidly braced to secure stability when handled in the water for the purpose of removing minnows.

The present invention, therefore, seeks to provide a trap adapted to be folded into absolutely flat form and in which the funnel or entrance portion is comprised of foldable sections and mounted to swing within the the body of the trap so as to effectually brace and maintain the walls thereof in the application and use of the trap.

The invention has for an object to provide a novel and improved construction in which the trap walls are formed of reticulated material and hinged to each other so as to fold into flat position and the entrance portion is composed of similar hinged sections adapted to fold in a like manner and pivotally mounted upon the walls of the trap so as to swing toward the interior thereof and when in such position brace the trap walls against collapsing and maintain the relative parts in proper position for use.

Another object of the invention is to provide the trap with an end wall opposite the funnel portion pivotally mounted so that the contents of the trap may be removed together with securing devices for holding this end wall and also the entrance portion in proper relation to the body of the trap.

Other and further objects and advantages of the invention will be hereinafter set forth and the novel features thereof defined by the appended claims.

In the drawing:

Figure 1 is a perspective of the invention with part broken away.

Figure 2 is an end view from the entrance end of the trap.

Like numerals of reference refer to like parts in the several figures of the drawings.

Figure 5:
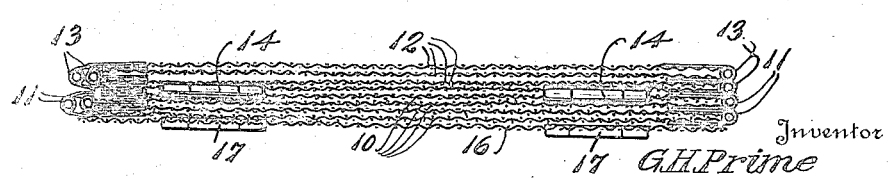
Figure 5 is an end view of the folded trap.

The trap may be formed of any desired material and may be of any configuration, preferably of a galvanized wire structure which will resist rust under submerged conditions. The numeral 10 designates the walls of the trap portion of which four are herein shown, forming a rectangular structure, but the shape or form of the trap may be altered and the number of walls used correspondingly changed. These reticulated sections are connected together by any desired form of hinge, for instance, as shown at 11, such being a permanent or fixed hinge, so that the sections of the trap body are always connected and when folded two thereof rest upon the remaining two while the walls are refolded upon each other to form a substantially flat compact body, as shown in Figure 5.

The entrance portion of the trap is formed of rectangular configuration to correspond with the body thereof and comprises the sections 12, similarly connected by fixed flexible hinges 13 so as to fold in either direction in like manner to the body. The entrance or funnel portion thus comprises a unit which swings inward within the body walls and braces the same against collapsing. For this purpose the entrance portion is hinged to one of the body walls as shown at 14.

It is understood that the inwardly tapering walls 12 of the funnel or entrance portion converge toward each other and terminate at a point removed from their apex sufficient to provide the inlet opening or passage 15.

At the opposite end of the trap from the entrance funnel an end wall 16 is provided and hinged at 17 to a wall 10 of the trap body. This door or rear wall may be secured in position when in use by means of securing devices 18 such as the hooks engaging the eyes 19 and arranged at the unsecured sides of the end. When the parts are collapsed this door is folded downward upon the wall of the trap to which it is pivoted, and it will be obvious that the door may be readily opened for the purpose of removing the contents of the trap.

The entrance or funnel portion of the trap may be secured in position by means of hooks 20 pivoted upon the side walls and engaging the edges of the entrance portion, as shown in Figure 1.

In the practical construction of the invention the walls of the main trap may be formed from separate sections of material pivoted to each other at their end portions by means of the hinges 11 and secured intermediate thereof by a connecting ring or eye 21.

Figure 3:
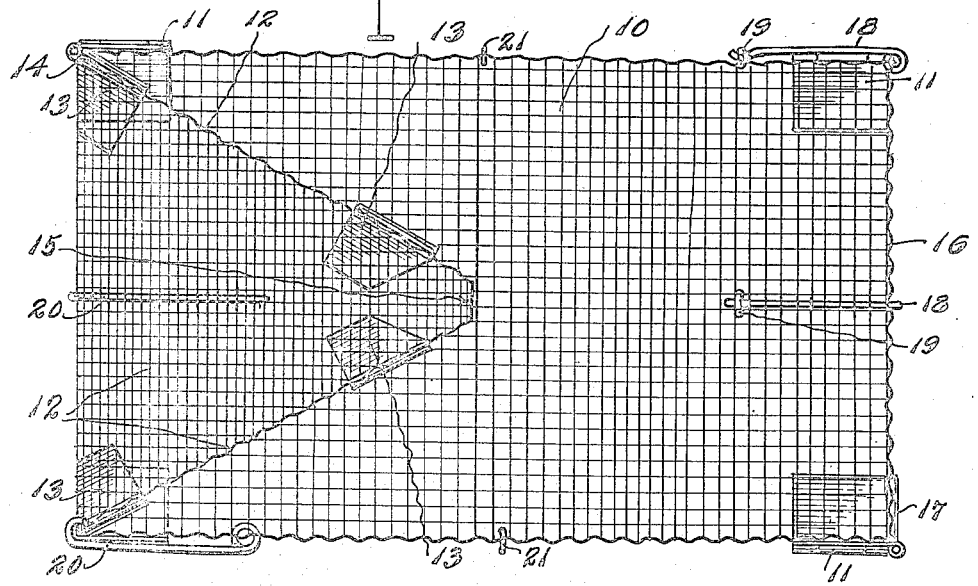
Figure 3 is a plan of the trap in folded position.
Figure 4:
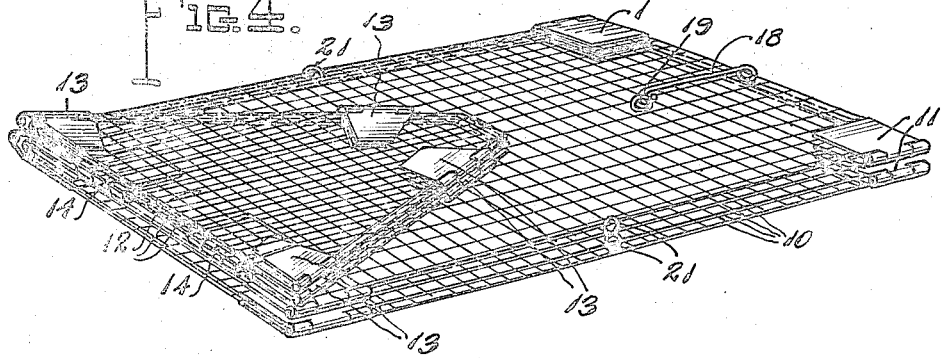
Figure 4 is a perspective of the same.

In the operation of the invention the trap may be folded into a flat compact form shown in Figures 4 and 5 and thus readily carried by a sportsman in his kit or pocket while when opened in position for use, as shown in Figures 1 and 2, the main walls are braced by the insertion of the entrance portion which is swung inward and secured in position as shown. This bracing is further accomplished by the opposite end wall or door similarly secured to the body of the trap. The fixed pivotal mounting between the sections constantly retain the same in assembled relation yet permit the convenient shifting of position for the purpose of folding and collapsing the trap when desired. In this folding action the funnel is swung bodily outward from the trap and two walls thereof folded into contact with each other, these walls being then refolded upon each other and the collapsed funnel folded back upon the similarly folded body portion, as shown in Figures 4 and 5. For this purpose the hinged joints between the parts are flexible for free movement in opposite directions and spaced to permit the folding and refolding of the walls into a flat position.

It will be obvious that the trap is not confined in its use to submerged or fishing purposes but may be used for other insects or animals attracted thereto by bait properly applied within the trap.

While the details of the invention have been specifically shown and described it is not confined thereto as changes and alterations may be made therein without departing from the spirit of the invention as defined by the appended claims.

Having thus described my invention, what I claim as new and desire to secure by Letters Patent, is:

1. A trap comprising a plurality of sections having fixed hinged connections to fold upon each other, and an entrance funnel formed of sections each having fixed hinged connections to fold in opposite directions, said funnel being bodily pivoted to a wall of the trap to swing relative to the interior thereof.

2. A trap comprising a plurality of sections having fixed hinged connections to fold in opposite directions upon each other, an entrance funnel formed of sections having fixed hinged connections foldable in opposite directions, said funnel being bodily pivoted to a wall of the trap to swing relative to the interior thereof, and securing devices carried by the trap walls to engage the free edges of the walls of said entrance funnel.

3. A trap comprising a plurality of sections having flexible hinged connections to fold upon each other, an entrance funnel formed of sections having fixed hinged connections foldable in opposite directions, said funnel being bodily pivoted to a wall of the trap to swing relative to the interior thereof, an end wall pivotally connected to one of the trap sections, and securing means for retaining said end wall in closed position.

In testimony whereof I affix my signature.

GEORGE H. PRIME.